United States Patent
Zawadzki et al.

(10) Patent No.: US 11,325,702 B2
(45) Date of Patent: May 10, 2022

(54) TETHERED AERIAL DRONE SYSTEM

(71) Applicant: MOTOROLA SOLUTIONS, INC., Chicago, IL (US)

(72) Inventors: Artur Zawadzki, Cracow (PL); Rafal Leszek Adamski, Cracow (PL); Michal Slusarczyk, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 575 days.

(21) Appl. No.: 16/324,656

(22) PCT Filed: Aug. 19, 2016

(86) PCT No.: PCT/PL2016/050035
§ 371 (c)(1),
(2) Date: Feb. 11, 2019

(87) PCT Pub. No.: WO2018/034578
PCT Pub. Date: Feb. 22, 2018

(65) Prior Publication Data
US 2019/0217952 A1    Jul. 18, 2019

(51) Int. Cl.
*B64C 39/02* (2006.01)
*G05D 1/10* (2006.01)
(Continued)

(52) U.S. Cl.
CPC .......... *B64C 39/022* (2013.01); *B64C 39/024* (2013.01); *B64D 1/02* (2013.01);
(Continued)

(58) Field of Classification Search
CPC ................ B64C 39/022; B64C 39/024; B64C 2201/027; B64C 2201/108;
(Continued)

(56) References Cited

U.S. PATENT DOCUMENTS 8,109,711 B2 *    2/2012    Blumer ..................... F03D 1/00
                                                    415/2.1
8,350,403 B2 *    1/2013    Carroll .................. B64C 39/022
                                                    290/55
(Continued)

FOREIGN PATENT DOCUMENTS

KR              101627347            6/2016

OTHER PUBLICATIONS

Torsten et al., "Applicaiton-driven design of aerial communication networks," IEEE Communications Magazine, IEEE Service Center, Piscataway, US, vol. 52, No. 5, May 1, 2014 (May 1, 2014), pp. 129-137, XP011548483, ISSN: 0163-6804, DOI:10.1109/MCOM.2014.6815903 [retrieved on May 14, 2014].
(Continued)

*Primary Examiner* — Benjamin P Lee
(74) *Attorney, Agent, or Firm* — Michael Best & Friedrich LLP (57) ABSTRACT

Methods and systems are described for an aerial drone system including a drone system controller, at least one working drone (101), and a plurality of support drones (103). The working drone (101) is operated by the drone system controller (125) to adjust a position of the working drone (101). A tether line (105) coupled to the working drone (101) provides electrical power to the working drone (101). The support drones (103) are each coupled to the tether line (105) at a different location along the tether line (105) forming a tethered aerial drone system. Each support (drone 103) supports a portion of the weight of the tether line (105) and is operated by the drone system controller (125) to adjust the position of the tether line (105) by adjusting the position of one or more of the support drones (103).

23 Claims, 7 Drawing Sheets

(51) Int. Cl.
*G05D 1/08* (2006.01)
*H02G 11/00* (2006.01)
*B64D 1/02* (2006.01)
*B64D 1/22* (2006.01)
*B64D 47/08* (2006.01)
*B64F 3/02* (2006.01)
*H02G 11/02* (2006.01)

(52) U.S. Cl.
CPC ............... *B64D 1/22* (2013.01); *B64D 47/08* (2013.01); *B64F 3/02* (2013.01); *G05D 1/0866* (2013.01); *G05D 1/104* (2013.01); *H02G 11/00* (2013.01); *H02G 11/02* (2013.01); *B64C 2201/027* (2013.01); *B64C 2201/108* (2013.01); *B64C 2201/143* (2013.01); *B64C 2201/148* (2013.01); *B64C 2201/162* (2013.01)

(58) Field of Classification Search
CPC ........ B64C 2201/143; B64C 2201/148; B64C 2201/162; B64F 3/02; G05D 1/0866; G05D 1/104
See application file for complete search history.

(56) References Cited

U.S. PATENT DOCUMENTS

| | | |
|---|---|---|
| 2013/0233964 A1 | 9/2013 | Woodworth et al. |
| 2015/0158576 A1* | 6/2015 | Jones .................... B64C 39/024 701/2 |
| 2015/0295646 A1 | 10/2015 | Clemmensen |
| 2017/0043872 A1* | 2/2017 | Whitaker ................. B64D 1/18 |
| 2020/0108923 A1* | 4/2020 | Smith .................... B64D 47/08 |
| 2020/0109698 A1* | 4/2020 | Pedersen ............... B64C 39/022 |
| 2020/0406773 A1* | 12/2020 | Lacaze ................... B60L 53/35 |

OTHER PUBLICATIONS

PCT/PL2016/050035 International Search Report and Written Opinion of the International Searching Authority dated May 17, 2017 (8 pages).

\* cited by examiner

TETHERED AERIAL DRONE SYSTEM

BACKGROUND OF THE INVENTION

Aerial drones can be used for tasks such as observation and surveillance. However, the usefulness of an aerial drone for certain tasks and in certain environments may be limited by the weight and charge capacity of a battery pack providing operating power to the aerial drone. The limitations of a battery pack may be alleviated by use of a tether line coupled between the aerial drone and an electrical power source, but the operation and position of the aerial drone may still be limited by the position and weight of the tether line.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Methods and systems provided in this disclosure provide and operate an aerial drone system including a drone system controller, at least one working drone, and a plurality of support drones. The working drone is operated by the drone system controller to adjust a position of the working drone. A tether line coupled to the working drone provides electrical power to the working drone. The support drones are each coupled to the tether line at a different location along the tether line forming a tethered aerial drone system. Each support drone partially supports the weight of the tether line and is operated by the drone system controller to adjust the position of the tether line by adjusting the position of one or more of the support drones.

Figure 1:
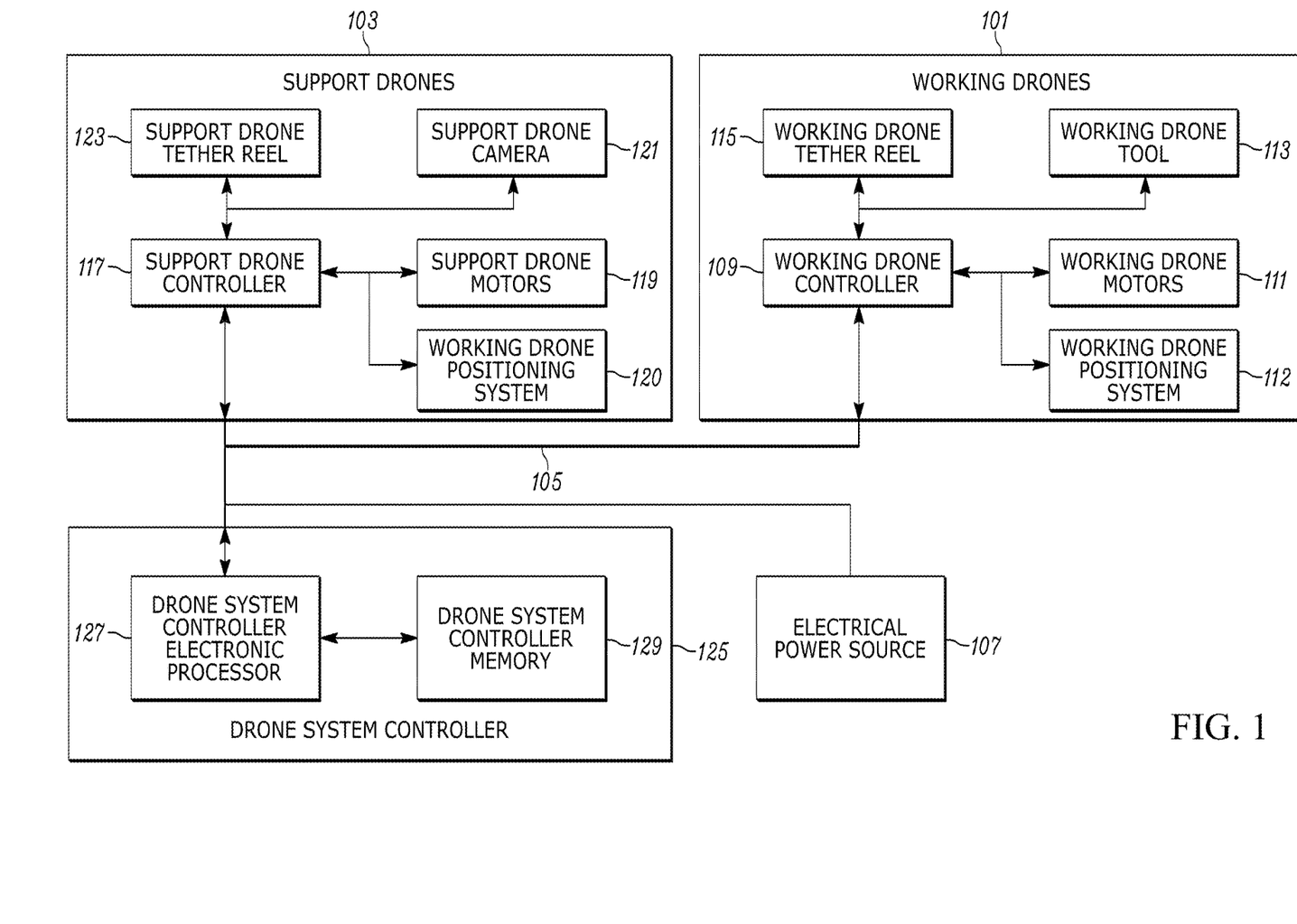
FIG. 1 is a block diagram of an aerial drone system in accordance with some embodiments.

FIG. 1 is a block diagram of an aerial drone system. The drone system includes at least one working drone 101 and at least one support drone 103. In the discussion below, working drone 101 and support drone 103 are used to refer to working drones and support drones, generally. Other reference numerals are used when referring to specific drones in specific examples or arrangements.

A tether line 105 attaches the working drone 101 and the support drone 103 to an electrical power source 107 positioned at a fixed location—for example, on the ground or on a building. Electrical operating power is provided to the working drone 101 and the support drone 103 from the electrical power source 107 through the tether line 105.

The working drone 101 includes a working drone controller 109 that controls the operation of the working drone 101. In particular, the working drone controller 109 provides control signals to a plurality of working drone motors 111 that operate the propellers of the working drone 101 as discussed further below. The working drone 101 also includes a working drone positioning system 112 configured, in some implementations, to provide feedback information to the working drone controller 109 regarding the position and altitude of the working drone 101. In some implementations, the working drone positioning system 112 includes a global positioning system ("GPS") and an altimeter. Based on position information provided by the working drone positioning system 112, the working drone controller 109 determines how to operate the working drone motors 111 to move the working drone 101.

The working drone controller 109 is also coupled to a working drone tool 113 to provide control signals and, in some cases, to receive information from the working drone tool 113. The working drone tool 113 is configured to perform a working task or operation provided by the working drone 101. For example, in some implementations, the working drone tool 113 includes a camera to capture video or still images. In other implementations, the working drone tool 113 includes a radio transceiver providing for extended range communication when the working drone 101 is moved into an appropriate position. In still other implementations, the working drone tool 113 includes a crane system for lifting and lowering a load from the working drone 101.

In some embodiments, as discussed in further detail below, the working drone 101 also includes a working drone tether reel 115 for adjusting the length of the tether line between the working drone 101 and an adjacent drone (e.g., support drone 103).

Similarly, the support drone 103 includes a support drone controller 117 that controls the operation of the support drone 103. In particular, the support drone controller 117 provides control signals to the support drone motors 119 that operate the propellers of the support drone 103. The support drone 103 also includes a support drone positioning system 120 configured, in some implementations, to provide feedback information to the support drone controller 117 regarding the position and altitude of the support drone 103. In some implementations, the support drone positioning system 120 includes a global positioning system ("GPS") and an altimeter. Based on position information provided by the support drone positioning system 120, the support drone controller 117 determines how to operate the support drone motors 119 to move the support drone 103.

In some implementations, the support drone 103 is also equipped with a support drone camera 121 that is communicative coupled to the support drone controller 117. However, in other implementations, the support drone 103 does not include any on-board support drone camera 121. Finally, the support drone 103 includes a support drone tether reel 123 that is operated by the support drone controller 117 to adjust the length of the tether line between the support drone 103 and an adjacent drone (e.g., working drone 101 or another support drone 103) or between the support drone 103 and a tether base as discussed in further detail below.

The example of FIG. 1 also includes a drone system controller 125 positioned near the electrical power source 107 at a proximal end of the tether line 105. The drone system controller 125 includes a drone system controller electronic processor 127 and a drone system controller memory 129. The drone system controller memory 129 stores instructions that are executed by the drone system controller electronic processor 127 to provide for the functionality of the drone system controller 125 as described further below. Similarly, in some embodiments, the support drone controller 117 and the working drone controller 109 each include an electronic processor and memory to provide for certain control functionality of the support drone 103 and the working drone 101, respectively. In additional to providing electrical operating power from the electrical power source 107 to the support drone 103 and the working drone 101, the tether line 105 includes a communication bus facilitating electronic communication between the drone system controller 125, the support drone controller 117, and the working drone controller 109.

Although the example of FIG. 1 and various other examples discussed further below describe the drone system controller 125 as being coupled to the proximal end of the tether line 105, in some other embodiments, the drone system controller 125 may be integrated into the working drone 101 or another aerial drone such that coordinate operation of the various drones in the aerial drone system is provided by a drone system controller 125 positioned in flight with the other aerial drones of the drone system.

Figure 2:
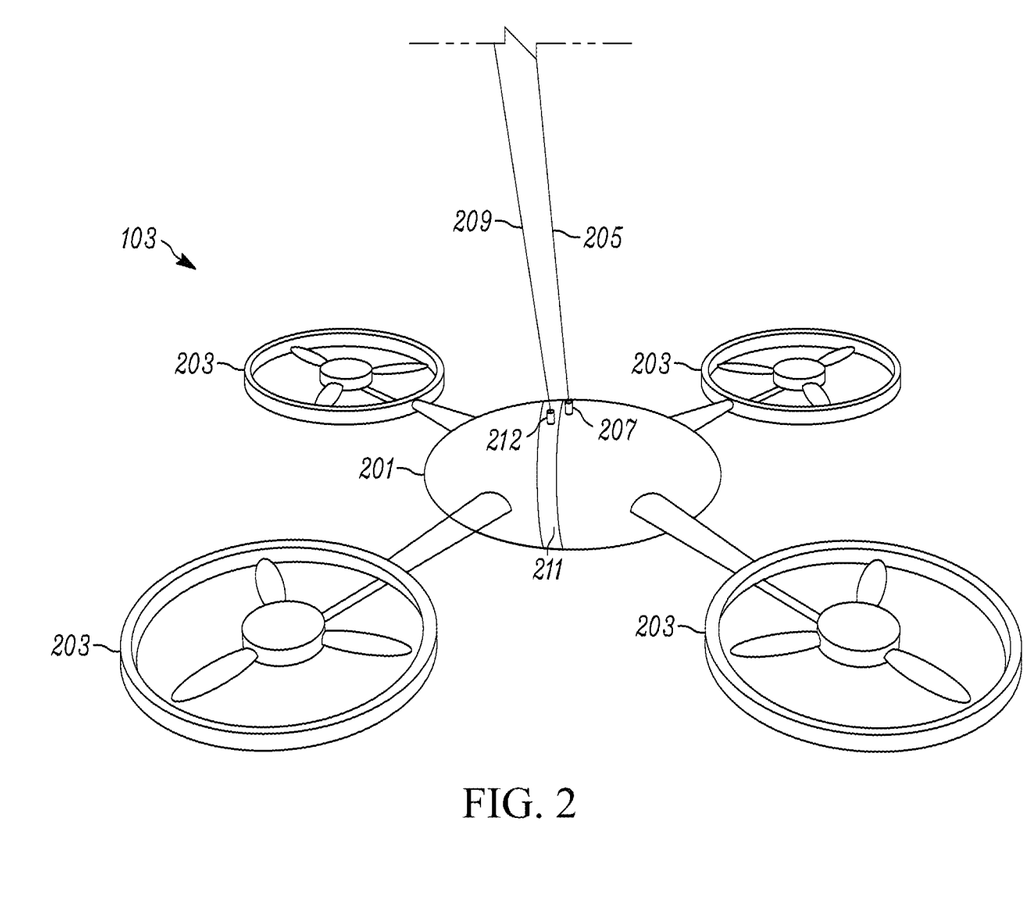
FIG. 2 is a perspective view of an individual support drone of the aerial drone system of FIG. 1 in accordance with some embodiments.

FIG. 2 illustrates the configuration and construction of one example of a support drone 103 in further detail. A drone body 201 is coupled to four controllable propellers 203. In the example of FIG. 2, the support drone 103 is coupled to a first adjacent drone (not pictured) by a first cable 205 attached to the drone body 201 at a stationary coupling 207. The drone 103 is also coupled to a second adjacent drone (not pictured) by a second cable 209 attached to the controllable spool 211 on the drone body 201. The controllable spool 211 on the exterior of the drone body 201 is part of the support drone tether reel 123 discussed above in reference to FIG. 1. The controllable spool 211 is rotated to selectively release or retract a portion of the second cable 209 wound around the drone body 201 on the controllable spool 211 to adjust the length of the second cable 209 between the support drone 103 and the second adjacent drone.

In some implementations, the controllable spool 211 rotates to coil the second cable 209 around the exterior surface of the drone body 201. However, in other implementations, such as the example illustrated in FIG. 2, the controllable spool 211 includes an exterior ring and an interior spool portion. As the interior spool portion rotates to retract and coil the second cable 209, the second cable 209 is drawn through an opening 212 on the exterior ring. The exterior ring freely rotates as necessary to accommodate movement of the support drone 103 so that the second cable 209 always enters the opening 212 without wrapping itself around the exterior of the drone body 201.

However, the support drone 103 illustrated in FIG. 2 is only one example and other implementations are possible. For example, in FIG. 2, the stationary coupling 207 is positioned on top of the drone body 201, but, in other implementations, the stationary coupling may be positioned elsewhere on the drone body 201 such as, for example, the side or the bottom. In still other implementations, the second coupling (i.e., the stationary coupling 207 in FIG. 2) is not stationary and is configured to move on the exterior of the drone body 201.

Furthermore, in the discussion of FIG. 1, the support drone 103 and the working drone 101 both include a tether reel (i.e., support drone 103 includes support drone tether reel 123 and working drone 101 includes working drone tether reel 115). Accordingly, in some embodiments, the first cable 205 coupled to the drone body 201 at the stationary coupling 207 couples the support drone 103 to an adjacent drone that is located proximal to the electrical power source 107 relative to the support drone 103 and, as such, the working drone 101 also includes a working drone tether reel 115 that adjusts the length of the cable between the working drone 101 and an adjacent support drone 103. However, in other implementations, the support drone tether reel 123 and the controllable spool 211 of the support drone 103 adjusts a length of cable between the support drone 103 and an adjacent drone that is distal to the electrical power source 107 relative to the support drone 103. Accordingly, in some such embodiments, a working drone tether reel 115 is not included in the working drone 101 and, instead, a based tether reel (not pictured) is positioned at the location where the tether line 105 is affixed to the electrical power source 107 to adjust the length of the cable between the affixed "base" and the first adjacent drone.

Finally, in the example of FIG. 2, the tether line 105 is formed of a plurality of cables (including the first cable 205 and the second cable 209 shown in FIG. 2) coupling each individual drone to one or more adjacent drones. However, in other implementations, the tether line 105 may be provided as a single cable tethered to each individual drone at different locations spaced at predetermined distances along the length of the single cable.

The drone system discussed above enables one or more working drones (e.g., working drone 101) to be positioned and operated at a target location while the tether line 105 is coupled to provide operating power to the working drones and to transmit data and control signals. As a result, in some embodiments, there is no need for a large battery pack on the working drone 101 that would provide operating power for the working drone 101. Furthermore, because the weight of the tether line 105 is supported by a plurality of support drones (e.g., support drone 103), the weight and thickness of the tether line 105 can be larger than if the tether line 105 were supported only by the working drone 101. Similarly, the support drones (e.g., support drone 103) can be controlled to position the tether line 105 around obstacles and/or outside of an operating area of the working drone 101.

Figure 3:
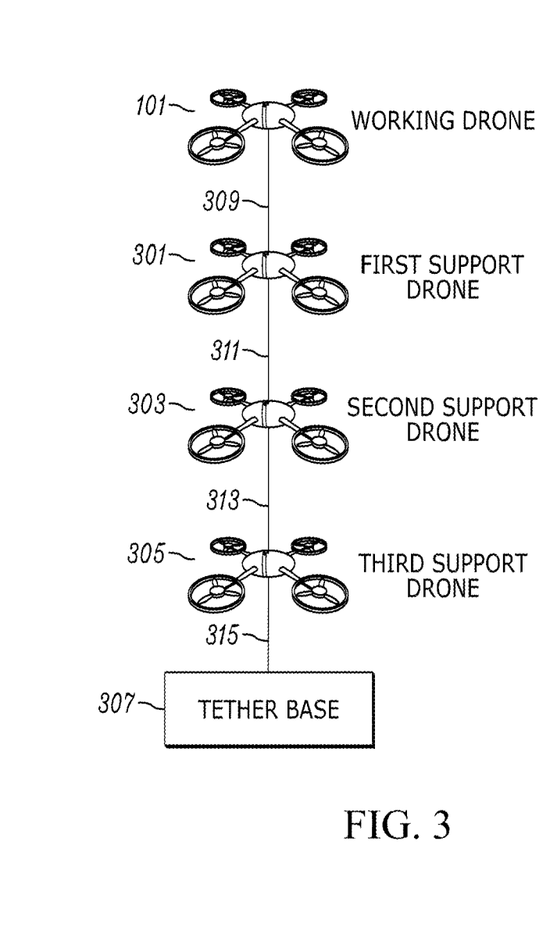
FIG. 3 is a side view of an aerial drone system in a vertical arrangement in accordance with some embodiments.

FIG. 3 illustrates one example arrangement of the drone system. In this example, a working drone 101 is coupled to a first support drone 301, which is, in turn, coupled to a second support drone 303, a third support drone 305, and a tether base 307. In this example, the tether base 307 is affixed to or positioned at a stationary location on the ground. However, in other examples, the tether base 307 can be positioned at another location such as, for example, a roof of a building, a side or ledge of a building, a crane, or an antenna. The working drone 101 is coupled to the first support drone 301 by a first cable 309, the first support drone 301 is coupled to the second support drone 303 by a second cable 311, the second support drone 303 is coupled to the third support drone 305 by a third cable 313, and the third support drone 305 is coupled to the tether base 307 by a fourth cable 315. In this example, the tether line 105 including each individual cable 309, 311, 313, 315 and the length of each individual cable 309, 311, 313, 315 between two adjacent drones is adjustable, for example, using the controllable spool 211 of FIG. 2.

Figure 4:
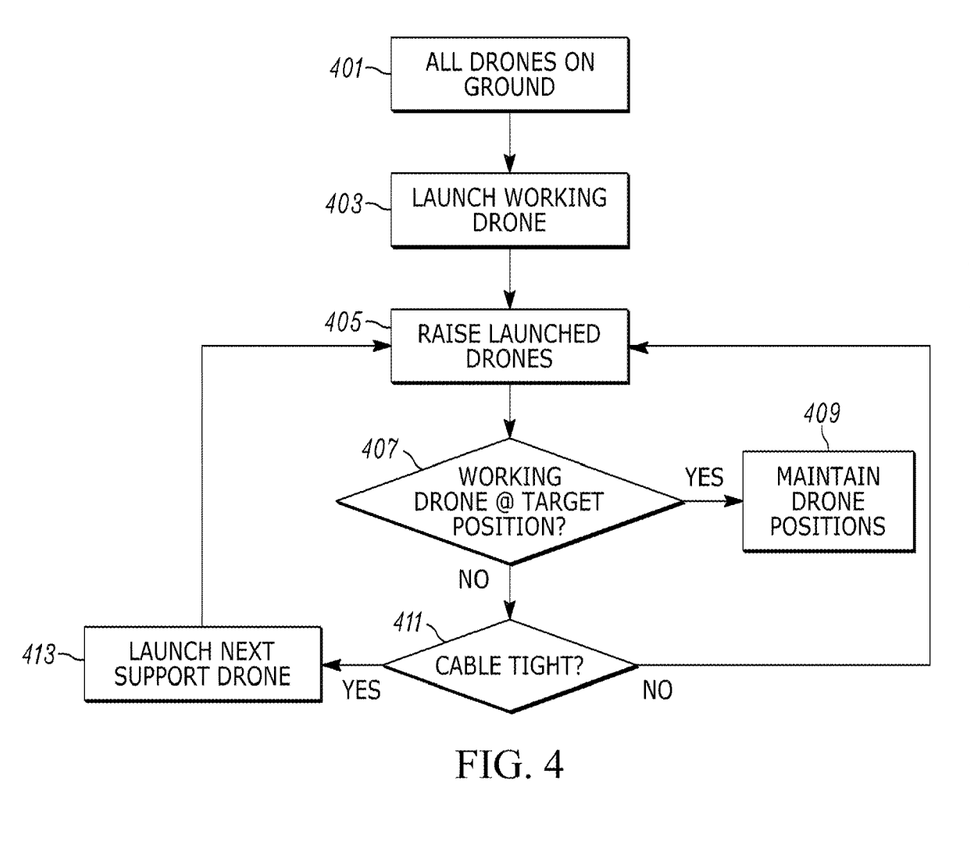
FIG. 4 is a flowchart of a method of launching the drones of the aerial drone system of FIG. 3 from a ground position in accordance with some embodiments.

FIG. 4 illustrates a method for launching the drone system as illustrated in the example of FIG. 3. First, all drones are positioned on the ground at block 401. The working drone 101 is launched at block 403. At this point, the working drone 101 is the only drone that is "launched" and, at block 405, it is raised towards a target position. At block 407, the drone system controller 125 determines whether the working drone 101 is at its target position. Once the working drone 101 reaches its target position, the drone system controller 125 operates to maintain the position of any launched drones at block 409. However, if the working drone 101 has not yet reached its target position, the drone system controller 125 monitors the cable between the most recently launched drone and either the next adjacent unlaunched drone or the tether base 307 at block 411. In some implementation, the drone system controller 125 monitors a tension on the cable and, at block 413, launches the next drone when the tension exceeds a tension threshold. However, in other implementations, the drone system controller 125 monitors the distance between the most recently launched drone (e.g., the amount of cable that has been released from the controllable spool 211) and, at block 413, launches the next drone when the amount of released cable and/or the distance travelled by the most recently launched drone meets or exceeds a threshold indicative of a predetermined distance between adjacent drones.

In reference to the particular example of FIG. 3, the working drone 101 is launched at block 403 and is raised at block 405. The drone system controller 125 determines at block 407 that the working drone has not yet reached its target position, so the working drone 101 is continually raised towards the target position until the drone system controller determines at block 411 that the first cable 309 has reached its threshold. At that point, the first support drone 301 is launched at block 413. The working drone 101 and the first support drone 301 are raised (block 405) until the second cable 311 reaches its threshold at block 411 and the second support drone 303 is launched at block 413. Similarly, the working drone 101, the first support drone 301, and the second support drone 303 are raised until the third cable 313 reaches its threshold at block 411 and the third support drone 305 is launched at block 413. With all three support drones 301, 303, 305 launched, the working drone 101 is able to reach its target position as illustrated in FIG. 3.

Figures 5, 6:
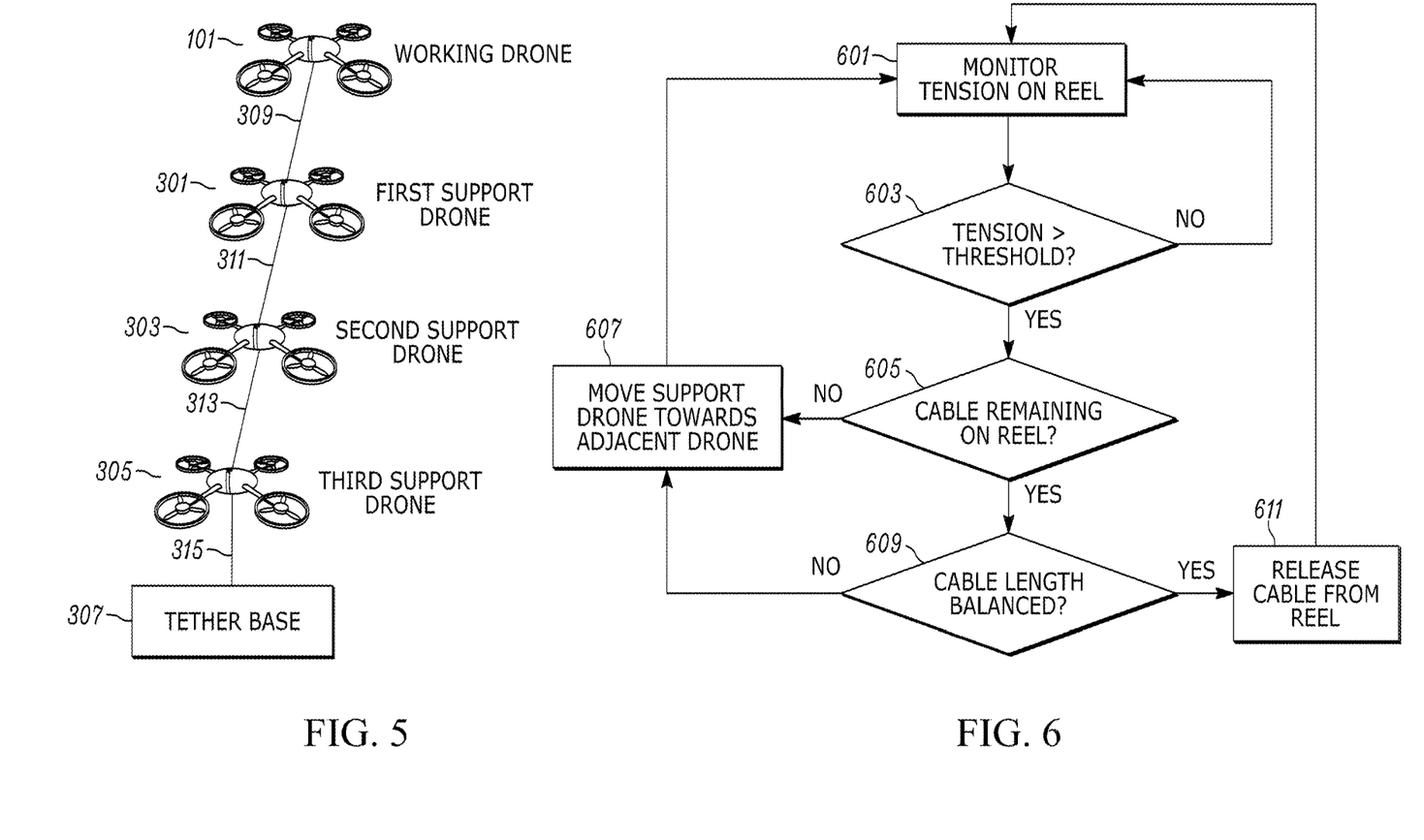
FIG. 5 is a side view of an aerial drone system of FIG. 3 after the working drone has moved to an operating area in accordance with some embodiments.
FIG. 6 is a flowchart of a method of operating each individual support drone to facilitate movement of the working drone in the arrangement of FIG. 5 in accordance with some embodiments.

In the example of FIG. 3, the working drone 101 and the three support drones 301, 303, 305 are arranged vertically. However, in some situations, the working drone 101 may need to be positioned at a target location off of the vertical arrangement or the working drone 101 may need to be moved after the drone system is launched. For example, FIG. 5 illustrates an example where the working drone 101 has been moved to the right. To facilitate this movement and positioning of the working drone 101, some of all of the support drones 301, 303, 305 are also moved and, in some implementation, the length of the cables 309, 311, 313, 315 are also adjusted.

FIG. 6 illustrates a method for controlling the movement of the drone system after the drones have been launched such as in the example arrangement of FIG. 5. For the purposes of illustration, the method of FIG. 6 is discussed below in specific reference to the second support drone 303. However, in some implementations, the method illustrated in FIG. 6 is performed in parallel for each support drone 103 equipped with a tether reel (e.g., support drone tether reel 123) regulating the length of the released cable between the support drone 103 and the next adjacent support drone 103 distal from the tether base 307.

The drone system controller 125 monitors a tension on the support drone tether reel 123 of the second support drone 303 at block 601 and compares the tension to a threshold at block 603. As long as the tension does not exceed a threshold at block 603, the drone system controller 125 does not take any action even if the working drone 101 or the other support drones 103 (e.g., the first support drone 301) are moving. However, once the tension on the support drone tether reel 123 exceeds the threshold—which, in some implementations, is indicative of the second support drone 303 is being "pulled" by the movement of the first support drone 301—the drone system controller 125 determines how to reduce the tension on the second cable 311 and to accommodate the movement of the working drone 101 and the first support drone 301.

First, the drone system controller 125 determines whether there is a portion of the second cable 311 remaining on the support drone tether reel 123 at block 605. If there is no portion of the second cable 311 remaining on the support drone tether reel 123, then the position of the second support drone 303 is moved towards the first support drone 301 at block 607 to reduce the tension on the second cable 311.

However, if the drone system controller 125 determines that there is a portion of the second cable 311 remaining on the support drone tether reel 123 at block 605, then the drone system controller 125 determines whether the cable lengths between each individual pair of adjacent drones is balanced at block 609. This balancing is performed in some implementations to, among other things, ensure that the weight of the tether line 105 is balanced among the launched drones (e.g., the working drone 101 and the support drones 301, 303, and 305) such that each of the launched drones is partially supporting the weight of the tether line. If the cable lengths are not balanced, the drone system controller moves the second support drone 303 towards the first support drone 301 to reduce the tension on the second cable 311. However, if the drone system controller 125 determines that the cable length will generally remain balanced at block 609, the drone system controller 125 operates the support drone tether reel 123 of the second support drone 303 to release an additional length of the second cable 311 to reduce the tension at block 611. The drone system controller 125 then continues to monitor the tension on the second cable 311 and on the support drone tether reel 123 of the second support drone 303 and to make adjustments to the position of the second support drone 303 and/or the portion of the second cable 311 that is released as appropriate.

Although the example of FIG. 6 specifically illustrates a method of adjusting the position of the drones and/or the amount of released cable to reduce tension as the working drone 101 moves away from the support drones 301, 303, 305, the drone system controller 125 is, in some implementations, similarly configured to detect a tension between adjacent drones that falls below another tension threshold indicative of excessive cable or "slack" in the cable between two adjacent drones. For example, if the tension on the second cable 311 falls below a lower tension threshold, the drone system controller 125 would determine whether to move the second support drone 303 further away from the first support drone 301 to increase the tension on the second cable 311 or to retract a portion of the second cable 311.

The examples illustrated in FIGS. 4 and 6 describe feedback-based methods for regulating the position of the various drones in the drone system. However, in some implementations, the positioning of the individual drones and the amount of cable released between adjacent drones are controlled according to an optimized arrangement. In some implementations, sensor feedback provided by the working drone 101 and/or by one or more of the support drones 103 (e.g., visual data from support drone camera 121) is used to update the optimized arrangement as the drone system is launched and operated.

Figure 7:
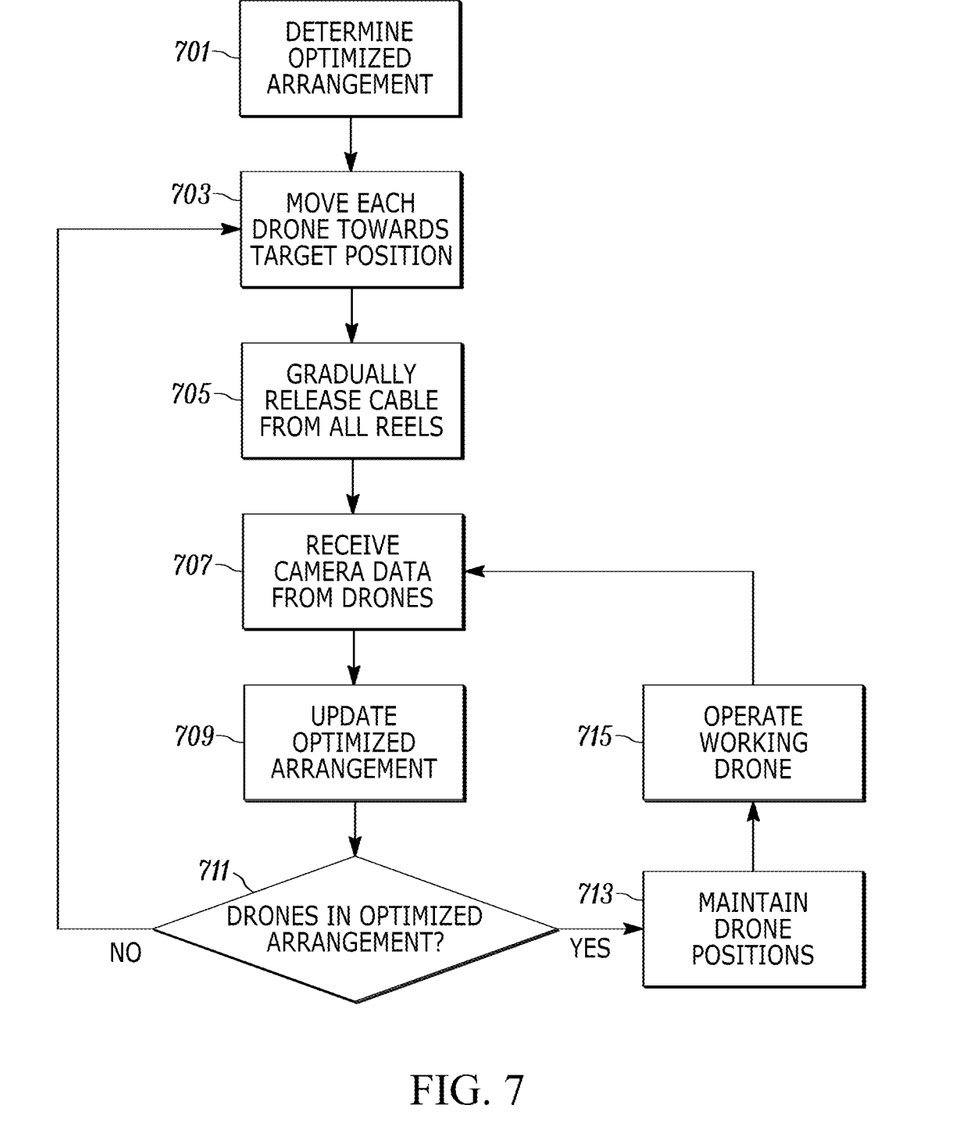
FIG. 7 is a flowchart of a method of operating each individual support drone to facilitate placement of the drones in an optimized arrangement in accordance with some embodiments.

FIG. 7 illustrates one example of a method for controlling the position of the various drones based on a determined optimized arrangement. Based on the work to be performed by the working drone 101 and known information about the operating area, the drone system controller 125 determines an optimized arrangement at block 701 including a target position for each individual drone in the drone system. The necessary drones are launched and moved towards their target position at block 703. As the drones are moved, the cable between adjacent drones is gradually released from the support drone tether reel 123 at block 705. The drone system controller 125 receives camera data from each support drone camera 121 at block 707 and updates the optimized arrangement at block 709. In other implementations, the drone system controller 125 may use data from other devices integrated into one or more of the support drones 103 to determine and update the optimized arrangement including, for example, a laser range-finder, an echo-location system, and radar. If the drones are not yet positioned in the optimized arrangement at block 711, then the drone system controller 125 continues to move each drone towards its target position at block 703 and continually updates the optimized arrangement as necessary at block 709. After the drone system controller 125 determines that the drones are all positioned in the optimized arrangement at block 711, the drone system controller 125 maintains the position of each drone at block 713 and operates the working drone 101 at block 715 to perform its intended task. While the working drone 101 is being operated, the drone system controller 125 continues to receive camera data from the support drones 103 at block 707, determines whether the optimized arrangement should be updated at block 709, and determines whether the drones are still in the optimized arrangement at block 711. If the drones are no longer in their optimized arrangement, due, for example, to a change in the optimized arrangement or to being blown or pulled out of position, the drone system controller 125 resumes moving the drones towards their target positions at block 703.

As discussed above, the methods and systems provided in this disclosure enable one or more working drones 101 to be positioned in an operating area while a tether line 105 is supported and positioned by a plurality of support drones 103. As a result, the weight of the tether line 105 supported by the working drone 101 is reduced and the tether line 105 can be positioned to avoid contact with obstacles and to be positioned outside of the operating area of the working drone 101. FIGS. 8, 9, 10, and 11 provide examples of various arrangements and implementations where the support drones 103 are used to facilitate operation and positioning of a working drone 101.

Figure 8:
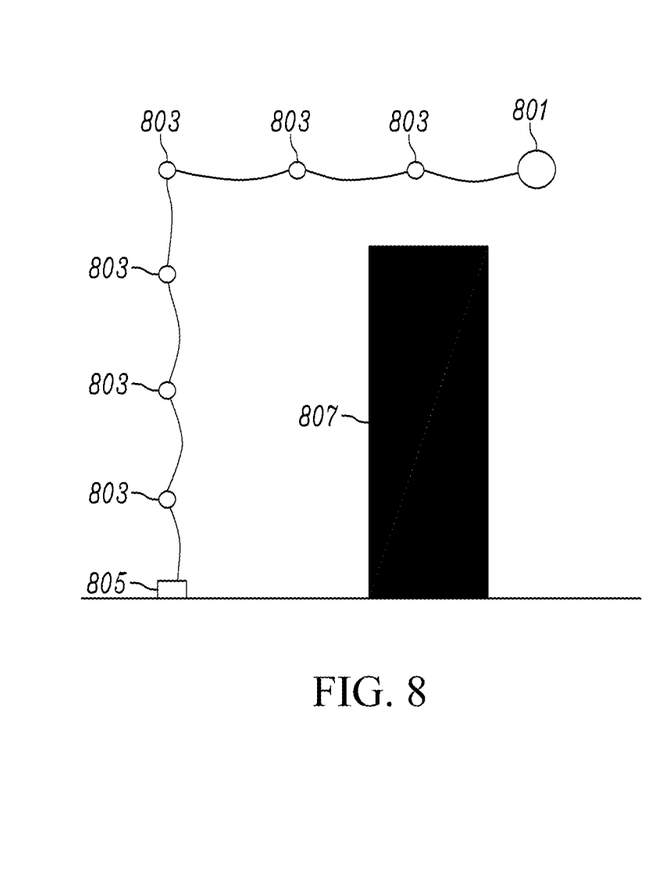
FIG. 8 is a side view of an aerial drone system arranged to position a working drone over an obstacle while avoiding contact between the tether line and the obstacle in accordance with some embodiments.

In the example of FIG. 8, a single working drone 801 and six support drones 803 are coupled to a tether base 805. The working drone 801 is to be positioned at an operating area on a side of a vertical obstacle 807 opposite the tether base 805. To facilitate placement of the working drone 801 at the operating area, the support drones 803 are positioned in a right angle arrangement to reduce to the weight of the tether line 105 supported by the working drone 801 and to avoid contact between the tether line 105 and the obstacle 807. Similarly, FIG. 9 shows an example where a working drone 901 and six support drones 903 are coupled to a tether base 905 and are arranged to position the tether line 105 around a horizontal obstacle 907 so that the working drone 901 can be positioned at an operating area on an opposite side of the horizontal obstacle 907 from the tether base 905.

Figure 9:
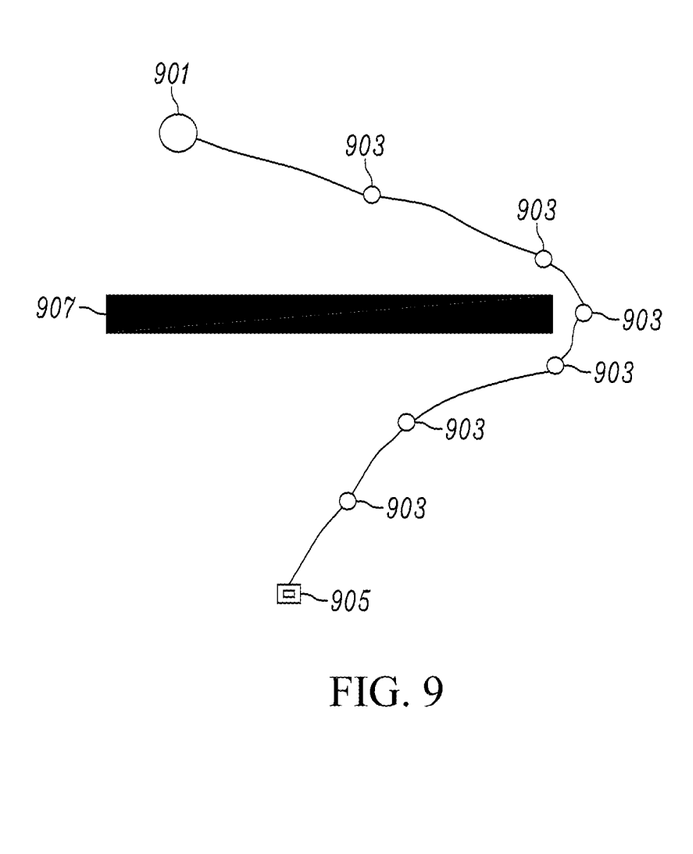
FIG. 9 is a top view of an aerial drone system arranged to position a working drone around an obstacle while avoiding contact between the tether line and the obstacle in accordance with some embodiments.
Figure 10:
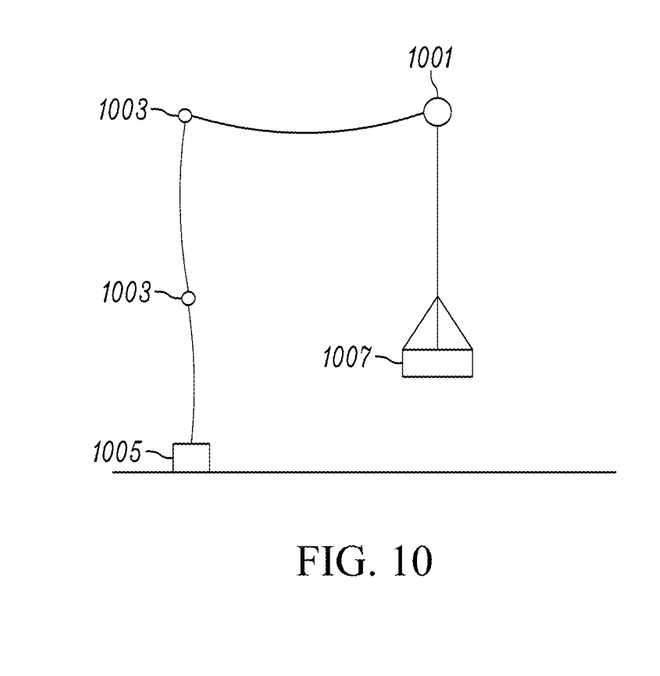
FIG. 10 is a side view of an aerial drone system including a working drone configured to operate as a crane in accordance with some embodiments.

In the examples of FIGS. 8 and 9, the working drones 801, 901 may be equipped, for example, with a camera for surveillance or an antenna to facilitate wireless communication. In examples that include a working drone camera, the support drones 803, 903 position the tether line outside of the field of view of the working drone camera so that the tether line does not appear in or obstruct images captured by the camera. Similarly, FIG. 10 illustrates an example where the working drone 1001 is equipped with a crane system for lifting and lowering a load 1007 in an operating area below the working drone 1001. In this example, two support drones 1003 are coupled between the working drone 1001 and a tether base 1005 and are arranged to position the tether line outside of the operating area below the working drone 1001. Because of this support placement, the tether line can provide sufficient operating power to the working drone 1001 to lift the weight of the load 1007 without the placement of the tether line blocking or interfering with the movement of the load 1007 in the operating area below the working drone 1001.

Figure 11:
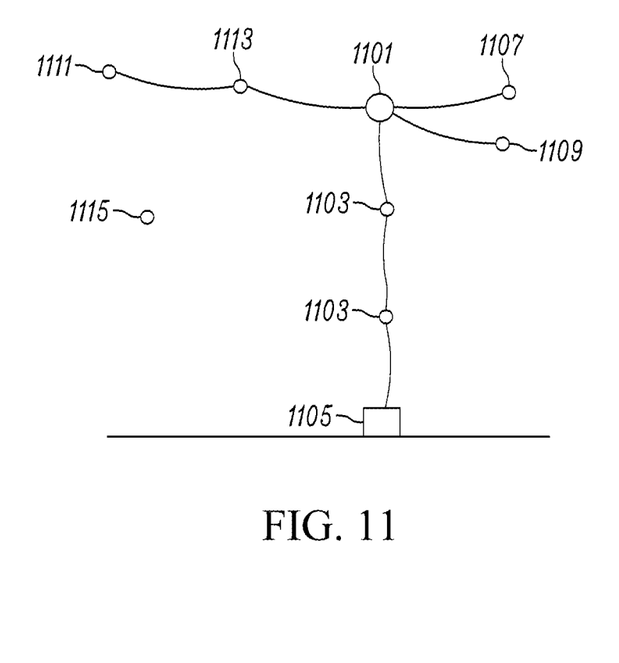
FIG. 11 is a side view of an aerial drone system with a plurality of working drones coupled to a single tether line in accordance with some embodiments.

Although the examples discussed above include a single working drone 101 and a plurality of support drones 103, some implementations may include only a single support drone 103 or may include multiple working drones 103. FIG. 11 illustrates an example of a drone system with multiple different working drones. A first working drone 1101 is coupled by a tether line supported by two support drones 1103 to a tether base 1105. The first working drone 1101 operates as a hub drone for a plurality of additional working drones including a second working drone 1107, a third working drone 1109, and a fourth working drone 1111. In the example of FIG. 11, the second working drone 1107 and the third working drone 1109 are each coupled directly to the first working drone 1101 by a cable while the tether line between the first working drone 1101 and the fourth working drone 1111 is supported by another support drone 1113.

In arrangements where one working drone (e.g., the first working drone 1101) serves as a hub drone for other working drones, the other working drones may be referred to as "satellite" drones. A working drone operating as a hub drone may be configured to provide at least one support function to the additional working drones such as, for example, providing electrical operating power and/or data communication for one or more wireless working drones 1115. In some implementations, wireless working drone 1115 can be controlled to land on the hub drone (i.e., the first working drone 1101) for charging through a wired coupling or a wireless interface such as, for example, inductive charging. Similarly, in some implementations, rather than communicating directly with other drones or remote systems through its own wireless interface, the wireless working drone 1115 communications wirelessly with the hub drone (i.e., the first working drone 1101), which then relays data communication between the wireless working drone 1115 and the other drones or remote systems through the tether line that is supported by support drones 1103.

In the foregoing specification, specific embodiments have been described. However, one of ordinary skill in the art appreciates that various modifications and changes can be made without departing from the scope of the invention as set forth in the claims below. For example, in various implementations, other specific arrangements of drones and the specific type of work performed by the one or more working drones may be provided by the tethered drone system. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment Thus the following claims are hereby incorporated into the Detailed Description, with each claim standing on its own as a separately claimed subject matter.

We claim:

1. An aerial drone system comprising:
   a drone system controller;
   a working drone operated by the drone system controller to adjust a position of the working drone;
   a tether line coupled to the working drone to provide electrical power to the working drone; and
   a plurality of support drones each coupled to the tether line at a different location along the tether line and each partially supporting a weight of the tether line forming a tethered aerial drone system in which each support drone of the plurality of support drones is operated by the drone system controller to adjust the position of the tether line by adjusting a position of one or more support drones of the plurality of support drones,
wherein the drone system controller is configured to determine an updated arrangement for the plurality of support drones based at least in part on the adjusted position of the working drone and transmit control signals to each support drone to cause the support drone to move according to the updated arrangement.

2. The aerial drone system of claim 1, wherein each support drone of the plurality of support drones is coupled to the tether line at locations spaced at predetermined distances along a length of the tether line.

3. The aerial drone system of claim 1, wherein the tether line includes a plurality of cables, wherein each cable of the plurality of cables is coupled between two adjacent support drones.

4. The aerial drone system of claim 3, wherein each support drone of the plurality of support drones includes a reel configured to adjust a length of the tether line by controllably releasing and retracting the cable coupling the support drone to an adjacent support drone,
wherein each support drone of the plurality of support drones is configured to detect a tension on the cable coupling the support drone to the adjacent support drone, and
wherein the drone system controller is configured to cause the support drone to adjust the position of the support drone and to operate the reel based on the detected tension on the cable.

5. The aerial drone system of claim 1, wherein the drone system controller is supported by the working drone, and wherein the drone system controller is configured to:
receive sensor feedback from at least one sensor mounted on at least one drone of the aerial drone system,
determine the updated arrangement for the plurality of support drones based at least in part on the received sensor feedback, and
operate each support drone of the plurality of support drones to move according to the updated arrangement by transmitting the control signals to each support drone through the tether line.

6. The aerial drone system of claim 1, wherein the drone system controller is coupled to a proximal end of the tether line, and wherein the drone system controller operates the working drone and each support drone of the plurality of support drones by transmitting control signals to the working drone and to each support drone through the tether line.

7. The aerial drone system of claim 1, wherein the working drone is configured to perform a task, wherein the drone system controller is configured to operate the working drone to position the working drone at a location to perform the task in an operating area, and wherein the drone system controller is configured to determine the updated arrangement for the plurality of support drones by determining an arrangement in which the the plurality of support drones position the tether line outside of the operating area.

8. The aerial drone system of claim 7, wherein the working drone includes a camera and wherein the operating area includes a field of view of the camera.

9. The aerial drone system of claim 7, wherein the working drone includes a crane system configured to lift and lower a load from the working drone in the operating area below the working drone.

10. The aerial drone system of claim 1, wherein the drone system controller is further configured to detect an obstacle proximal to an operating area of the working drone, and wherein the drone system controller is configured to determine the updated arrangement for the plurality of support drones by operating the plurality of support drones to position the tether line to avoid contact between the tether line and the obstacle proximal to the operating area.

11. The aerial drone system of claim 1, wherein the working drone operates as a hub drone, and further comprising a plurality of additional working drones each including a cable directly coupling the additional working drone to the hub drone.

12. The aerial drone system of claim 1, wherein the working drone operates as a hub drone, further comprising one or more wireless working drones, and wherein the hub drone provides at least one support function to the one or more wireless working drones, wherein the at least one support function includes battery charging for the one or more wireless working drones.

13. The aerial drone system of claim 1, wherein the drone system controller causes an additional support drone to be launched to support the weight of the tether line in response to a determination that a length of the tether line between the additional support drone and a most recently launched drone of the tethered aerial drone system exceeds a threshold indicative of a predetermined distance between adjacent drones.

14. The aerial drone system of claim 1, wherein at least one support drone of the plurality of support drones includes
a controllable spool positioned to rotatably coil and uncoil a portion of the tether line around a body of the at least one support drone on a horizontal axis to controllably adjust a length of the tether line between the at least one support drone and an adjacent drone, and
an exterior ring configured to freely rotate over the controllable spool, wherein the portion of the tether line extends from the controllable spool through an opening on the exterior ring, and wherein movement of the adjacent drone causes rotation of the exterior ring to adjust a rotational position of the opening on the exterior ring based on a position of the adjacent drone relative to the at least one support drone.

15. A method of positioning a working drone of a tethered aerial drone system in an operating area, the method including:
operating the working drone to adjust a position of the working drone relative to the operating area; and
adjusting a position of a tether line coupled to the working drone by operating a plurality of support drones,
wherein each support drone of the plurality of support drones is coupled to the tether line at a different location along the tether line, and
wherein each support drone of the plurality of support drones partially supports a weight of the tether line,
wherein adjusting the position of the tether line includes determining an updated arrangement for the plurality of support drones and transmitting control signals to each support drone to cause the support drone to move according to the updated arrangement.

16. The method of claim 15, further comprising adjusting a length of the tether line by operating a reel coupled to a support drone of the plurality of support drones to controllably release or retract a cable coupling the support drone to an adjacent support drone.

17. The method of claim 15, wherein the tether line includes a plurality of cables each coupled between a different pair of adjacent support drones, the method further comprising:

adjusting a length of the tether line by operating a reel coupled to a support drone of the plurality of support drones to controllably release or retract a cable coupling the support drone to an adjacent support drone;

detecting a tension on the cable between the support drone and an adjacent support drone; and adjusting the position of the support drone or operating the reel based on the detected tension.

18. The method of claim 15, further comprising capturing images using a camera of the working drone, and wherein determining the updated arrangement for the plurality of support drones includes determining an arrangement that causes the plurality of support drones to position the tether line outside of a field of view of the camera of the working drone.

19. The method of claim 15, further comprising lifting or lowering a load from the working drone in an area below the working drone using a crane system of the working drone, and wherein determining the update arrangement for the plurality of support drones includes determining an arrangement that causes the plurality of support drones to position the tether line outside of the area below the working drone while lifting or lowering the load.

20. The method of claim 15, wherein determining the updated arrangement for the plurality of support drones includes determining an arrangement that causes the plurality of support drones to position the tether line to avoid contact between the tether line and an obstacle proximal to the operating area.

21. The method of claim 15, further comprising:

operating the working drone around, above, and below obstacles; and facilitating movement of the working drone while avoid contact between the tether line and the obstacles by adjusting a position of one or more of the support drones and selectively increasing and decreasing individual lengths of the tether line between adjacent support drones.

22. The method of claim 15, further comprising launching an additional support drone to support the weight of the tether line in response to a determination that a length of the tether line between the additional support drone and a most recently launched drone of the tethered aerial drone system exceeds a threshold indicative of a predetermined distance between adjacent drones.

23. The method of claim 15, further comprising:

adjusting a length of the tether line between a support drone of the plurality of support drones and an adjacent drone by controllably coiling or uncoiling a portion of the tether line around the body of the support drone on a horizontal axis using a controllable spool causing the portion of the tether line to extend or retract through an opening on an exterior ring configured to freely rotate over the controllable spool, wherein movement of the adjacent drone causes rotation of the exterior ring to adjust a rotational position of the opening on the exterior ring based on a position of the adjacent drone relative to the support drone.

* * * * *